(12) United States Patent
Miyashita

(10) Patent No.: US 8,849,999 B2
(45) Date of Patent: Sep. 30, 2014

(54) DEVICE CONTROL APPARATUS AND METHOD FOR MONITORING DEVICE, CLIENT APPARATUS, AND DEVICE CONTROL SYSTEM

(75) Inventor: Ryosuke Miyashita, Niigata (JP)

(73) Assignee: Canon Imaging Systems Inc. (JP)

( * ) Notice: Subject to any disclaimer, the term of this patent is extended or adjusted under 35 U.S.C. 154(b) by 19 days.

(21) Appl. No.: 13/464,159

(22) Filed: May 4, 2012

(65) Prior Publication Data

US 2012/0284395 A1 Nov. 8, 2012

(30) Foreign Application Priority Data

May 6, 2011 (JP) ................................. 2011-103755

(51) Int. Cl.
| | | |
|---|---|---|
| G06F 15/173 | (2006.01) | |
| H04L 12/24 | (2006.01) | |
| H04L 12/26 | (2006.01) | |
| G06F 15/16 | (2006.01) | |

(52) U.S. Cl.
CPC ........ H04L 41/0816 (2013.01); H04L 43/0817 (2013.01)
USPC ............ 709/224; 709/203; 709/223; 709/226

(58) Field of Classification Search
CPC .......................... H04L 41/0816; H04L 43/0817
USPC ................................... 709/204, 203, 223, 224
See application file for complete search history.

(56) References Cited

U.S. PATENT DOCUMENTS

| | | | |
|---|---|---|---|
| 2002/0083143 A1* | 6/2002 | Cheng ........................... | 709/208 |
| 2009/0070458 A1 | 3/2009 | Fuse et al. | |
| 2010/0071053 A1 | 3/2010 | Ansari et al. | |
| 2010/0217837 A1 | 8/2010 | Ansari et al. | |

FOREIGN PATENT DOCUMENTS

| | | |
|---|---|---|
| CN | 1428034 A | 7/2003 |
| JP | 2003032381 A | 1/2003 |
| JP | 2007-317067 A | 12/2007 |
| WO | 0249276 A2 | 6/2002 |

OTHER PUBLICATIONS

Chinese OA dated Feb. 27, 2014 issued in counterpart CN appl No. 201080050211.6. English translation provided.

* cited by examiner

Primary Examiner — Hee Soo Kim
(74) Attorney, Agent, or Firm — Rossi, Kimms & McDowell LLP

(57) ABSTRACT

A device control apparatus which monitors a state change of a device independently without communication with a client apparatus. A device server as the device control apparatus monitors the state of a device locally connected thereto, using a definition file and a trigger detection algorithm for monitoring the state of the device, and detects a state change of the device. When a state change of the device is detected, the device server transmits a trigger notification indicative of the detection of the state change to the client apparatus. The device server starts a session with the client apparatus having received the trigger notification and relay data communication with the device, of which the state change has been detected. When the session with the client apparatus is disconnected, the device server restarts monitoring of the state of the device.

13 Claims, 9 Drawing Sheets

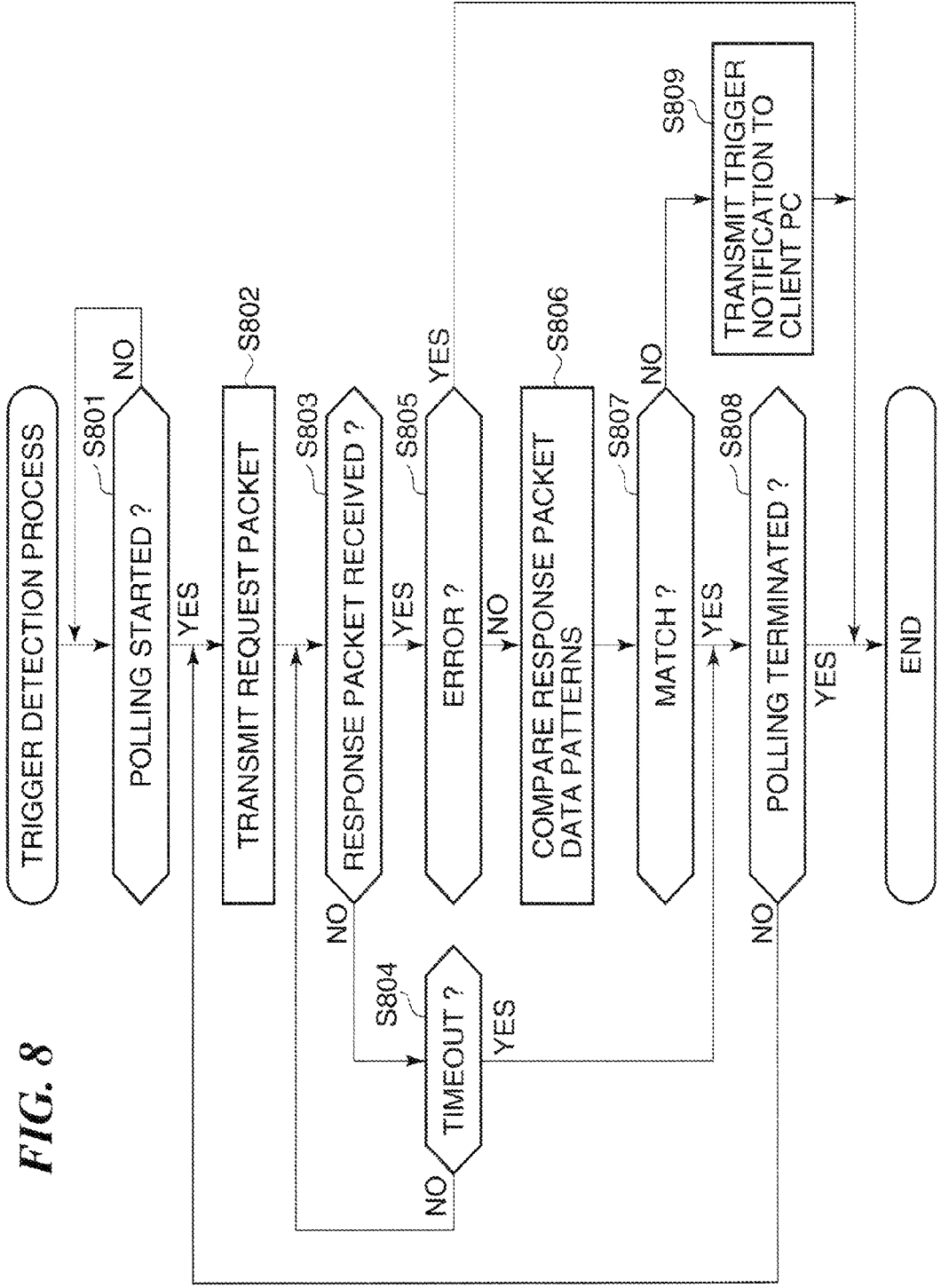

DEVICE CONTROL APPARATUS AND METHOD FOR MONITORING DEVICE, CLIENT APPARATUS, AND DEVICE CONTROL SYSTEM

BACKGROUND OF THE INVENTION

1. Field of the Invention

The present invention relates to a device control apparatus and method, a client apparatus, and a device control system, and more particularly to a device control apparatus equipped with a function for controlling devices via a network, a device control method, a client apparatus, and a device control system.

2. Description of the Related Art

With the widespread use of networks, there has been disclosed a device server configured to enable a device (peripheral device), which has conventionally been used by local connection e.g. to a personal computer (PC), to be used by a client PC on a network.

For example, there have been proposed some methods for enabling a client PC on a network to use a device, such as a printer, a storage, or a scanner, as a shared device via a device server.

As one of the methods, a method has been proposed in which dedicated application software (hereinafter referred to as "the utility") is preloaded in a client PC, and in the case of accessing a device, a user operates the preloaded utility, thereby causing the client PC to virtually recognize the device to be accessed, as a locally connected device, so that the user can access the device as if it is a locally connected device, from the client PC on a network.

In this method, which requires session (connection) start and end operations by a user, the session with a device server is occupied until the user executes an operation for terminating the session with the device using the utility, which disables use of the device by another client PC.

To solve the above-mentioned problem, there has been disclosed a network file management system in which a device server permits a specific client PC to perform data transmission with a device only for a time period during which block data having a data length specified by a block header is transmitted, regarding that the device server is in a data transmission occupation state (see e.g. Japanese Patent Laid-Open Publication No. 2007-317067).

Certainly, the network file management system disclosed in Japanese Patent Laid-Open Publication No. 2007-317067 makes it possible for a plurality of client PCs to share a device without execution of manual operation on the client PCs.

However, in a case where a device is connected which very frequently necessitates the state of occupation by a client PC, it is difficult for the client PC to use another device simultaneously due to a technical restriction that in a state where a client PC occupies one device connected thereto via a network, the client PC cannot use another device.

For example, in the case of using a device, such as an IC card reader, it is required to periodically make a query (polling) as to whether or not the IC card has been detected, i.e. to carry out a device monitoring process (change-of-state detection process) periodically. In general, the device monitoring process is executed by a device driver installed in a client PC.

For this reason, the device is frequently occupied by the client PC via the network, and traffic on the network markedly increases during the occupation of the device. Therefore, it is desirable that the occupation of the device is minimized.

Further, in a state where a device is frequently occupied and data is always flowing over the network, data is vulnerable to hacking. This is undesirable in terms of security.

In addition, when the above-mentioned device monitoring process (change-of-state detection process) is configured such that a device server stores only trigger detection algorithms applicable to specific devices, so as to eliminate model-dependence which makes processing different on a device-by-device basis, the device server loses its flexibility. On the other hand, when trigger detection algorithms applicable to various devices existing in the system are all stored in a device server, it is possible to maintain the flexibility of the device server. However, the device server needs a large-capacity storage area, which causes an increase in costs.

SUMMARY OF THE INVENTION

The present invention provides a device control apparatus and method, a client apparatus, and a device control system, in which the device control apparatus is provided with a device monitoring process (change-of-state detection process) function conventionally implemented in a client apparatus, whereby the device control apparatus monitors a state change of a device independently without communication with a client apparatus, and when a state change of the device is detected, the device control apparatus notifies the client apparatus of the detection of the state change, thereby dispensing with the need for device monitoring (polling) by the client apparatus and making it possible to reduce traffic on the network.

The present invention provides a device control apparatus and method, a client apparatus, and a device control system, in which communication between the client apparatus and the device is performed using a state change of the device as a trigger, whereby the client apparatus occupies the device only when necessary, to thereby reduce the vulnerability of security, and is capable of using a plurality of devices simultaneously even if occupation of each device is frequently required.

The present invention provides a device control apparatus and method, a client apparatus, and a device control system, in which a trigger detection algorithm and a definition file applicable to a device currently monitored are dynamically installed or downloaded into the device server, whereby the device server is capable of executing detection processing for various devices while maintaining its flexibility.

In a first aspect of the present invention, there is provided a device control apparatus connected to a client apparatus via a network and to which a device is to be locally connected, comprising a first detection unit configured to monitor a state of the device using a definition file and a trigger detection algorithm for monitoring the state of the device and detect a state change of the device, a transmission unit configured to be operable when the state change of the device is detected, to transmit a trigger notification indicative of the detection of the state change to the client apparatus, a data communication control unit configured to start a session with the client apparatus having received the trigger notification and relay data communication with the device, of which the state change has been detected, a second detection unit configured to detect termination of the data communication with the device and resulting disconnection of the session with the client apparatus, and a restart unit configured to be operable when the session with the client apparatus is disconnected, to cause the first detection unit to restart monitoring of the state of the device.

In a second aspect of the present invention, there is provided a client apparatus connected, via a network, to a device control apparatus to which a device is to be locally connected, comprising a generation unit configured to generate a definition file containing request information to a device locally connected to the device control apparatus and response information from the device, which were accumulated during polling for checking an operating state of the device, a transmission unit configured to transmit the generated definition file to the device control apparatus, a reception unit configured to receive a trigger notification indicative of a state change of the device from the device control apparatus having detected the state change of the device, a session control unit configured to start a session with the device control apparatus in response to the trigger notification received by the reception unit, and a virtualization control unit configured to virtually control the device of which the state change has been detected, via the device control apparatus with which the session has been started.

In a third aspect of the present invention, there is provided a device control system in which a device control apparatus to which a device is to be locally connected and a client apparatus are connected to each other via a network, wherein the device control apparatus comprises a first detection unit configured to monitor a state of the device using a definition file and a trigger detection algorithm for monitoring the state of the device and detect a state change of the device, a transmission unit configured to be operable when the state change of the device is detected, to transmit a trigger notification indicative of the detection of the state change to the client apparatus, a data communication control unit configured to start a session with the client apparatus having received the trigger notification and relay data communication with the device, of which the state change has been detected, a second detection unit configured to detect termination of the data communication with the device and resulting disconnection of the session with the client apparatus, and a restart unit configured to be operable when the session with the client apparatus is disconnected, to cause the first detection unit to restart monitoring of the state of the device, and wherein the client apparatus comprises a generation unit configured to generate a definition file containing request information to a device locally connected to the device control apparatus and response information from the device, which were accumulated during polling for checking an operating state of the device, a transmission unit configured to transmit the generated definition file to the device control apparatus, a reception unit configured to receive a trigger notification indicative of a state change of the device from the device control apparatus having detected the state change of the device, a session control unit configured to start a session with the device control apparatus in response to the trigger notification received by the reception unit, and a virtualization control unit configured to virtually control the device of which the state change has been detected, via the device control apparatus with which the session has been started.

In a fourth aspect of the present invention, there is provided a method of controlling a device control apparatus connected to a client apparatus via a network and to which a device is to be locally connected, comprising monitoring a state of the device using a definition file and a trigger detection algorithm for monitoring the state of the device to detect a state change of the device, transmitting, when the state change of the device is detected, a trigger notification indicative of the detection of the state change to the client apparatus, starting a session with the client apparatus having received the trigger notification and relaying data communication with the device, of which the state change has been detected, detecting termination of the data communication with the device and resulting disconnection of the session with the client apparatus, and causing, when the session with the client apparatus is disconnected, monitoring of the state of the device to be restarted.

With the above-described configuration, the device control apparatus monitors the device based on the trigger detection algorithm and the definition file, and sends a trigger notification when a state change of the device is detected. The client apparatus having received the trigger notification starts a session with the device control apparatus, and data communication is performed between the client apparatus and the device. When the data communication is completed and the session is disconnected, the device control apparatus restarts monitoring of the device. Thus, the device monitoring process conventionally performed by the client apparatus is executed by the device control apparatus, and hence the client apparatus need not perform the device monitoring process. Data communication is performed between the client apparatus and the device only when necessary, and when the data communication is completed, monitoring of the device is restarted.

Further, when the client apparatus detects connection of a device thereto, it performs polling for checking the operating state of the device, accumulates packets transmitted and received during the polling, and sends these packets to the device control apparatus. The device control apparatus can perform the monitoring process by using these packets transmitted and received during the polling for a definition file, which makes it possible to monitor even a device the connection of which is newly detected.

Further features of the present invention will become apparent from the following description of exemplary embodiments with reference to the attached drawings.

BRIEF DESCRIPTION OF THE DRAWINGS

FIG. 8 is a flowchart of a trigger detection process executed by a device server in the device control system according to the second embodiment.

DESCRIPTION OF THE EMBODIMENTS

The present invention will now be described in detail below with reference to the accompanying drawings showing embodiments thereof.

Figure 1:
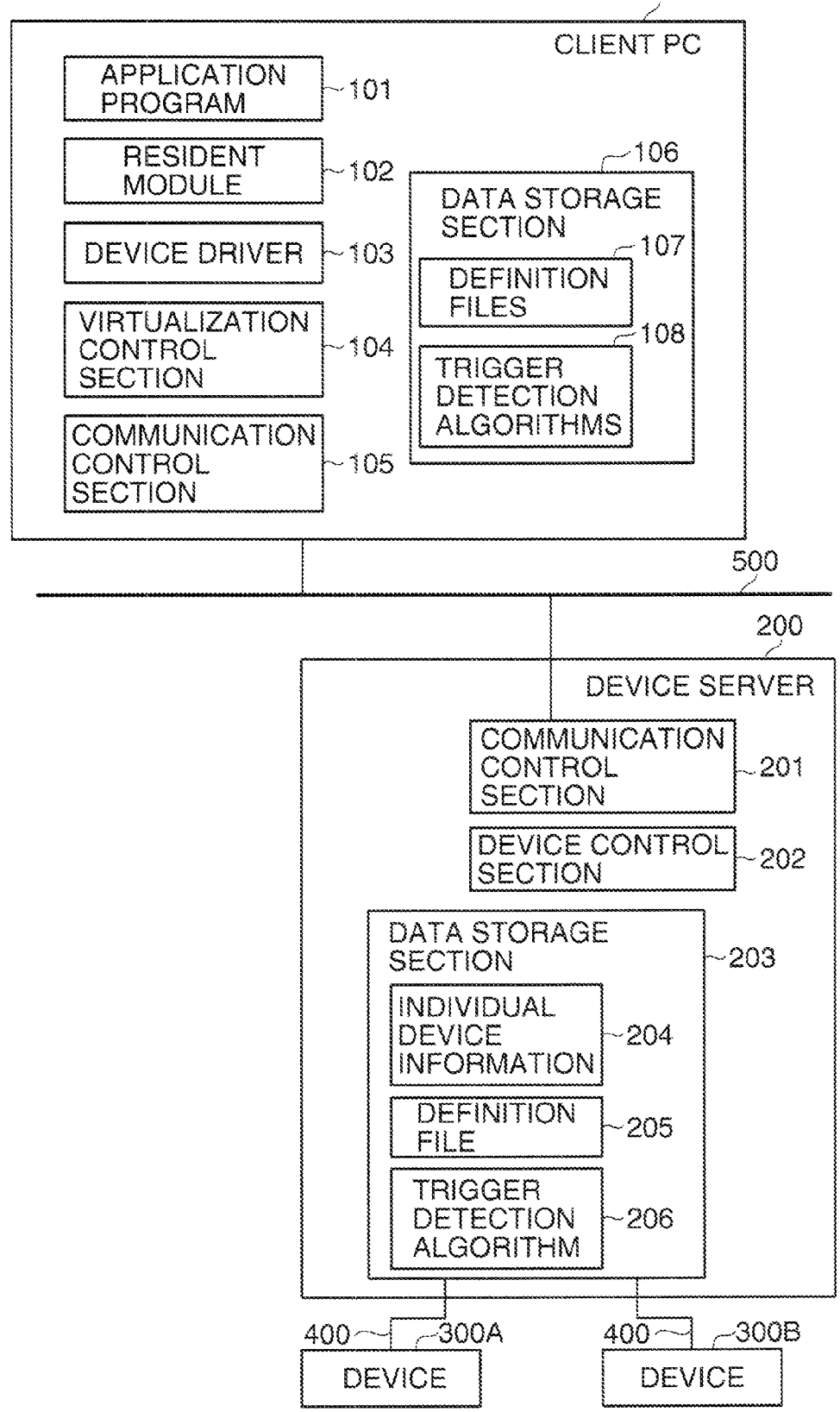
FIG. 1 is a schematic block diagram of a device control system according to a first embodiment of the present invention.

FIG. 1 is a schematic block diagram of a device control system according to a first embodiment of the present invention.

As shown in FIG. 1, the device control system of the first embodiment comprises a client PC 100 (client apparatus) and a device server 200 (device control apparatus) to which devices 300 (300A, 300B) are locally connected. The client PC 100 and the device server 200 are connected to each other via a network 500. The network 500 may be formed by a wired communication line or a wireless communication.

The device 300 is connected (locally connected) to the device server 200 by a connection cable 400 compliant with a USB (universal serial bus) interface. The connection cable 400 is not limited to the USB interface, but it may be compliant with another type of interface, such as the IEEE 1394.

Next, the configuration of each of apparatuses forming the device control system will be sequentially described.

The client PC 100 comprises, although not shown, a CPU, an input section, a display section, a memory, a communication section, and an external storage section, which are connected to one another via an internal bus. The client PC 100 is capable of communicating with the device server 200 from the communication section 115 via the network 500.

The external storage section stores software components, such as an operating system (hereinafter referred to as OS), not shown, an application program 101, a resident module 102, a device driver 103, a virtualization control section 104, and a communication control section 105, and includes a data storage section 106 that stores various kinds of data. Each of the software components and the various kinds of data is read into the memory under the control of the CPU, whereby various control processes are executed.

The application program 101 is a software program for controlling a device 300 by instructing data input/output request to the resident module 102 and the device driver 103.

The resident module 102 is equipped with the following functions:

(1) a function of acquiring individual device information for identifying each individual device 300 locally connected to the device server 200; (2) a function of identifying the model and the like of each individual device based on the individual device information; (3) a function of uniquely specifying the device driver 103 and the virtualization control section 104 necessitated for data transmission/reception to and from a device 300 and sequentially and dynamically generating and starting those software components; (4) a function of instructing the start and disconnection of a session with the device server 200 via the communication control section 105; and (5) a function of controlling data transmission/reception to and from the device 300 using the device driver 103 and the virtualization control section 104, after the start of a session with the device server 200.

The device driver 103 is a software component that converts a data input/output request from the OS (not shown) or the application program 101 (hereinafter referred to as "the higher-layer software program") to data in a data format applicable to the device 300 (hereinafter referred to "the control command"), sends the control command to the virtualization control section 104, and transfers a response to the control command from the device 300 to the higher-layer software program.

The virtualization control section 104 is a software component that converts the data input/output request converted to the control command by the device driver 103, to packet data conforming to the USB data format (hereinafter referred to as "USB data"), and converts USB data sent from the communication control section 105 to the same data format as that of the control command to transmit the data to the device driver 103. The virtualization control section 104 is also equipped with a function of simulating, in response to a request for data transmission/reception to or from a device 300, a behavior exhibited when the device 300 is directly connected (locally connected) to the client PC 100 (this function will be hereinafter referred to as "the virtualization control"). The "virtualization control" enables data transmission/reception in the same state as where the device 300 is locally connected to the client PC 100.

The communication control section 105 is a software component that performs protocol conversion between USB data received via the virtualization control section 104 and network packets during communication with the device server 200 via the network 500 to thereby control data transmission/reception to and from the device server 200. Further, the communication control section 105 performs control for starting or disconnecting a session with the device server 200 in response to a data transmission/reception request sent from the higher-layer application program or the device driver 103 via the virtualization control section 104.

The data storage section 106 stores various kinds of data including definition files 107 and trigger detection algorithms 108, etc., described hereinafter with reference to FIG. 3.

Each of the definition files 107 is a data file storing commands, information, etc. necessary for an associated trigger detection algorithm 108 in a case where the device server 200 monitors a device 300.

Each of the trigger detection algorithms 108 is a program code describing an execution procedure for the device server 200 to monitor a device 300 and detect a state change of the device 300. The device server 200 reads in a definition file 107 associated with the device 300, whereby a device monitoring process (hereinafter referred to as "the trigger detection process") for monitoring the device 300 is executed according to the above-mentioned execution procedure. The trigger detection process will be described hereinafter with reference to FIG. 4.

The definition file 107 and the trigger detection algorithm 108 are a pair of "monitoring information" (monitoring programs) for monitoring the device 300. Each of the definition file 107 and the trigger detection algorithm 108 differs according to the model of a device 300.

Figure 3:
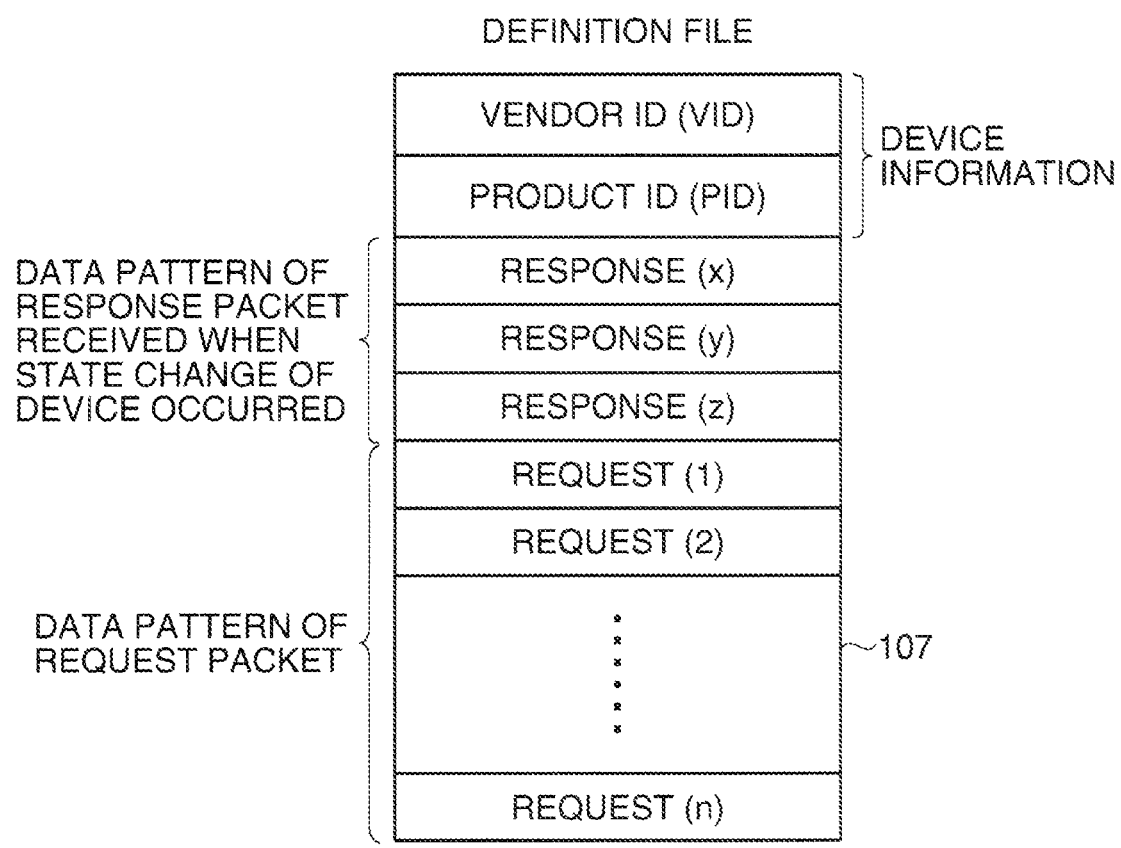
FIG. 3 is a diagram useful in explaining the data structure of a definition file stored in a data storage section appearing in FIG. 1.

FIG. 3 is a diagram useful in explaining the data structure of the definition file stored in the data storage section 106 appearing in FIG. 1.

The definition file in FIG. 3 is generated based on the functions (specifications) of a device 300. The definition file contains device identification information including a vendor ID (VID) and a product ID (PID), data patterns of a request packet sent to the device 300, and data patterns of a response packet received when the state of the device 300 changed. The data patterns of the response packet are the data patterns of only response packets sent from the device 300 when the state of the device 300 changed.

The device server 200 comprises, although not shown, a CPU, a memory, a communication section, a USB interface, and an external storage section, which are connected to one another via an internal bus. The device server 200 is capable of communicating with the client PC 100 via the network 500 and performing data transmission/reception to and from a device 300 (300A, 300B) locally connected to the USB interface 218 thereof by an associated connection cable 400.

The external storage section stores software components, such as an OS (not shown), a communication control section 201, and a device control section 202. Each of these software components and various kinds of data stored in a data storage section 203 of the external storage section is read into the memory and executed under the control of the CPU.

The communication control section 201 has a function of controlling (starting and disconnecting) a session with the client PC 100 connected from the communication section 215 via the network 500, under the control of the OS.

The device control section 202 has a function of controlling the device 300. Further, the device control section 202 has the following functions of acquiring individual device information 204, a definition file 205, and a trigger detection algorithm 206 via the communication control section 201 that controls communication performed from the communication section 215, and executing processing described below based on the acquired information (data):

(1) a function of performing conversion between network packets for communication with the client PC 100 and "USB data" transmitted/received to and from a device 300 and cooperating with the device control section 202 to thereby intermediate (relay) data transmission/reception between the client PC 100 and the device 300; (2) a function of transmitting the individual device information 204 acquired from a device 300 to the client PC 100; (3) a function of receiving (acquiring) a definition file 107 and a trigger detection algorithm 108 from the client PC 100; (4) a function of executing the trigger detection process for monitoring (polling) the device 300 at predetermined time intervals, using the definition file 205 and the trigger detection algorithm 206 (described hereinafter), and upon detection of a state change of the device 300, sending information indicative of the detection of the state change (hereinafter referred to as "the trigger notification") to the client PC 100; and (5) a function of detecting disconnection of a session with the client PC 100 by the communication control section 201, and restarting the trigger detection process mentioned in (4).

The individual device information 204 is information for identifying a device 300 on an individual device basis. The individual device information 204 includes a vendor ID (VID) assigned on a device manufacturer basis so as to identify each manufacturer, a product ID (PID) assigned on a device model basis so as to identify each model, and a serial number assigned on a device basis so as to identify each individual device. The individual device information 204 is acquired from a device 300 by the device control section 202 e.g. when the device 300 is connected to the device server 200.

The definition file 205 and the trigger detection algorithm 206 are information necessitated by the device server 200 for monitoring (polling) of a device 300 connected to the device server 200 itself. The device server 200 acquires the definition file 205 and the trigger detection algorithm 206 from the client PC 100 based on the individual device information 204.

The device 300 (300A, 300B) is a flexible input/output device having a USB interface. The device 300 is e.g. an input device, such as a keyboard, a mouse, or a card reader, a display (output) device, such as a display, a single-function peripheral (SFP), such as a printer, or a multi-function peripheral (MFP) equipped with not only a print function, but also a scan function, a copy function, a storage function, and so forth. However, this is not limitative, but the device 300 may be another kind of device.

For example, in a case where the device 300 is an IC card reader, assuming that an IC card is held over the IC card reader and the IC card reader performs an operation for reading the IC card, the device server 200 detects the reading operation as a state change of the device 300 and sends the trigger notification to the client PC 100.

In the present embodiment, the term "state change of a device" is intended to mean a change in the operating state of the device. A state change occurs e.g. when an IC card reader is operated for IC card reading (user ID acquisition) or when an operation button is pressed, but is not limited to these, either.

Although in the above-described embodiment, the device server 200 and the device 300 are provided separately from each other, this is not limitative, but the device server 200 and the device 300 may be provided integrally with each other.

Figure 2:
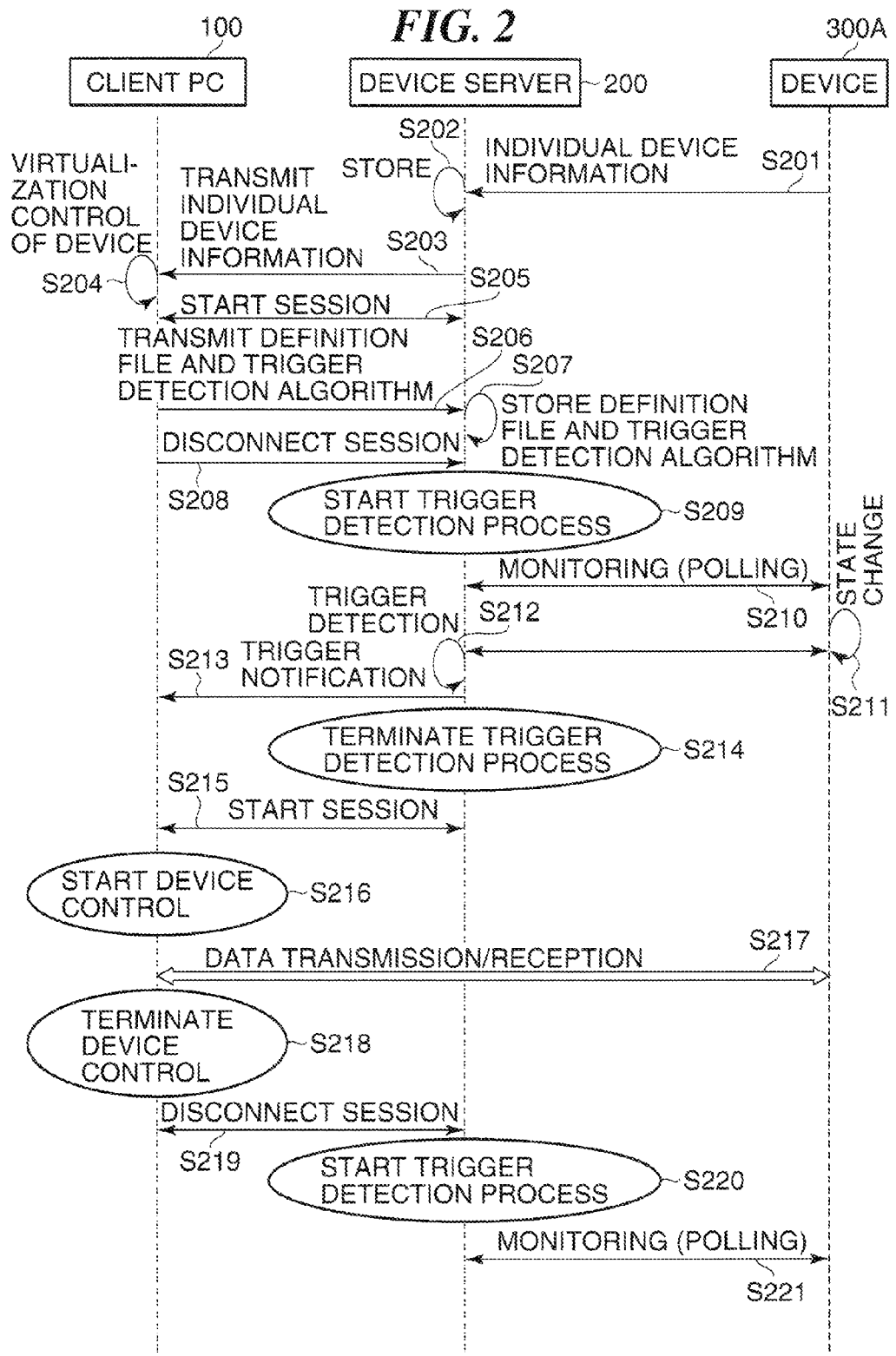
FIG. 2 is a sequence diagram useful in explaining an operation sequence executed by the device control system in FIG. 1.

FIG. 2 is a sequence diagram useful in explaining an operation sequence executed by the device control system in FIG. 1.

The sequence diagram in FIG. 2 shows a process of data transmission/reception performed between the client PC 100 and the device 300A connected to the device server 200.

In FIG. 2, when the device 300A is connected to the device server 200, the device server 200 acquires individual device information on the device 300A (step S201) and stores the acquired individual device information as individual device information 204 in the data storage section 203 (step S202).

At this time, the device server 200 determines whether or not the acquired individual device information 204 stores a serial number. If the acquired individual device information 204 does not store a serial number, the device server 200 generates unique information corresponding to a serial number, based on unique information held by the device server 200 itself (e.g. a MAC address) and unique information on a port to which the device is connected (e.g. a port number) and adds the generated unique information to the individual device information 204. This makes it possible to identify a device even when a plurality of devices of the same model, none of which has a serial number stored in individual device information 204 associated therewith, are connected to the device server 200.

Then, the resident module 102 of the client PC 100 sends a search packet to the device server 200 via the communication control section 105 so as to identify the device 300A locally connected to the device server 200. For example, the resident module 102 sends a search packet to (queries) the device server 200 using a protocol, such as UDP (user datagram protocol). Upon receipt of the search packet, the device server 200 sends the individual device information 204 stored in the data storage section 203 to the client PC 100 (step S203).

When the individual device information 204 is acquired from the device server 200, the resident module 102 of the client PC 100 identifies the device 300A based on a vendor ID (VID), a product ID (PID), a serial number, etc. contained in the individual device information 204, and uniquely specifies a device driver 103 and a virtualization control section 104 based on individual device-identifying information contained in the individual device information 204, sequentially generates these software components dynamically, and sequentially starts the software components. The software components make it possible for the client PC 100 to virtually control the device 300A (step S204).

The client PC 100 specifies a definition file 107 and a trigger detection algorithm 108 associated with the model of the device 300A identified based on the individual device information 204, from the definition files 107 and the trigger detection algorithms 108 stored in the data storage section 106.

Then, the client PC 100 generates an installation packet containing the specified definition file 107 and trigger detection algorithm 108, causes the communication control section 105 to start a session with the device server 200 (step S205), and sends the generated installation packet to the device server 200 (step S206).

When it is impossible to start the session due to no response (timeout) or connection rejection, or for some other reason, the device server 200 performs error handling (e.g. by sending an error notification to the device 300A or performing alarm notification in its own apparatus), followed by terminating the present process.

Upon receipt of the installation packet, the device server 200 installs the definition file 107 and the trigger detection algorithm 108 contained in the packet and stores these in the data storage section 203, as a definition file 205 (first definition file) and a trigger detection algorithm 206, respectively (step S207).

Note that when the device connected to the device server 200 is determined as a device other than the device 300A as a result of the identification based on the individual device information 204, the application program 101 of the client PC 100 does not execute the processing for generating the software components.

When the session between the client PC 100 and the device server 200 is disconnected (step S208), the device control section 202 of the device server 200 starts the trigger detection process (monitoring process), described hereinafter with reference to FIG. 4, associated with the device 300A, using the definition file 205 and the trigger detection algorithm 206 stored in the data storage section 203 (step S209). The trigger detection process is also started when the session is not started by the client PC 100 within a predetermined time period after issue of the trigger notification.

Figure 4:
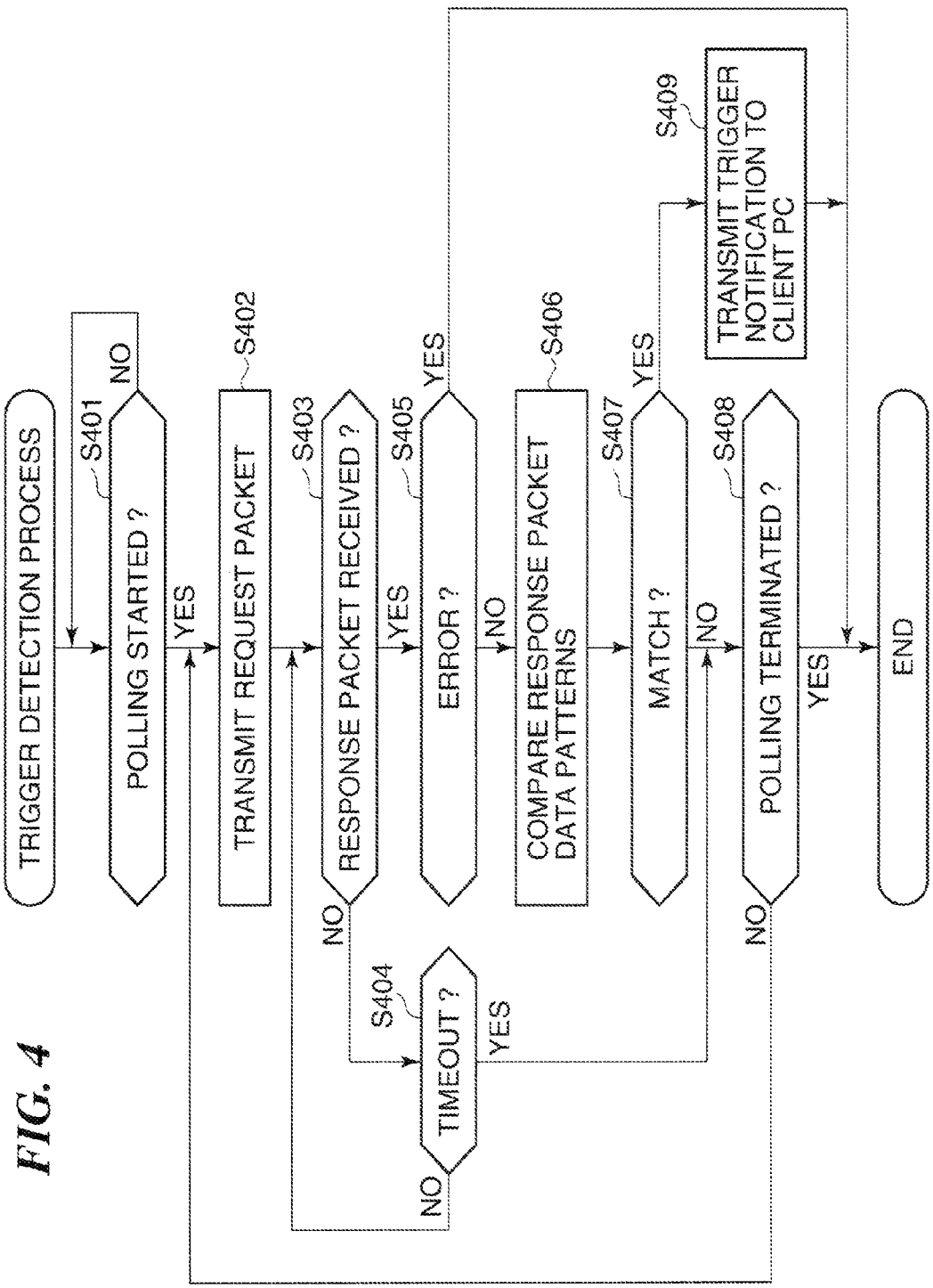
FIG. 4 is a flowchart of a trigger detection process executed by a device server appearing in FIG. 1.

FIG. 4 is a flowchart of the trigger detection process executed by the device server appearing in FIG. 1.

A state change of the device 300A is monitored by the trigger detection process in FIG. 4 (the steps S209 to S214 in FIG. 2). The trigger detection process in FIG. 4 is suspended when an interrupt from the client PC 100 occurs during execution of this process, and is resumed upon termination of the interrupt.

Referring to FIG. 4, first, when monitoring (polling) is started because of disconnection of a session between the client PC 100 and the device server 200 or timeout in which no session has been started by the client PC 100 within a predetermined time period after sending of the trigger notification (YES to a step S401), the device server 200 sends a request packet from the device control section 202 to the device 300A via the communication control section 201 and the communication section according to a request data pattern (request information) contained in the definition file 205 (see FIG. 3)(step S402). An interval of the monitoring (polling) can be set based on the definition file 205 (see FIG. 3). This interval is set so as to avoid occupation of the device server 200 by the trigger detection process and enable the use of another function (device).

Then, it is determined whether or not a response packet has been received from the device 300A (step S403). If a response packet has been received, it is determined whether or not error information is contained in the response packet (e.g. when the device 300A is disconnected) (step S405).

If it is determined in the step S405 that error information has been received, the present process is immediately terminated. On the other hand, if the response packet does not contain error information (NO to the step S405), the device control section 202 performs comparison between the response packet from the device 300A and each of response packet data patterns (response information) contained in the definition file 205 (step S406 (step S210 in FIG. 2)).

If it is determined by the comparison in the step S406 that the response packet from the device 300A matches one of the response packet data patterns contained in the definition file 205, it is judged that a state change has occurred in the device 300A (step S211 in FIG. 2), and hence this state change is detected (step S212 in FIG. 2), and that a trigger notification indicative of the state change is required to be transmitted (YES to a step S407), and the trigger notification is sent to the client PC 100 via the communication control section 201 and the communication section (step S409 (step S213 in FIG. 2)), followed by terminating the present process (step S214 in FIG. 2).

On the other hand, if it is determined by the comparison in the step S406 that the response packet from the device 300A does not match any of the response packet data patterns contained in the definition file 205 (no match), it is judged that no state change has occurred in the device 300A (NO to the step S407), and it is determined whether or not monitoring (polling) is terminated (step S408). As long as monitoring (polling) is not terminated (NO to a step S408), the steps S402 et seq. are repeatedly carried out to send a next request packet to the device 300A.

If it is determined in the step S403 that no response packet has been received from the device within a predetermined time period after transmission of the request packet (timeout) (YES to a step S404), the process proceeds to the step S408, wherein it is determined whether or not monitoring (polling) is terminated.

Referring again to FIG. 2, upon receipt of the trigger notification from the device server 200, the client PC 100 starts a session with the device server 200 (step S215) and starts data transmission/reception (relay of data communication) to and from the device 300A via the device server 200 (step S216) so as to achieve data transmission/reception (step S217). In the step S213, the device server 200 may transmit the trigger notification to the client PC 100 and request the client PC 100 to start a session.

Then, when the completion of the data transmission/reception (device control) is detected by the communication control section 105 of the client PC 100 (e.g. when an end operation by a user is detected) (step S218), the session with the device server 200 is disconnected (step S219). When the disconnection is detected, the device server 200 starts the trigger detection process (step S220) and restarts monitoring (polling) of the device 300A. Similarly, when a session is not started by the client PC 100 within the predetermined time period after transmission of the trigger notification, the device server 200 starts the trigger detection process (step S220) and restarts monitoring (polling) of the device 300A.

As described above, according to the first embodiment of the present invention, a control (communication) right over the device 300A is switched from the device server 200 to the client PC 100, in response to the trigger notification, and is switched again from the client PC 100 to the device server 200 when the session is disconnected. Thus, the client PC 100 and the device 300A can perform data communication only when required, and when the data communication is completed, monitoring of the device 300A by the device server 200 is restarted.

Figure 5A:
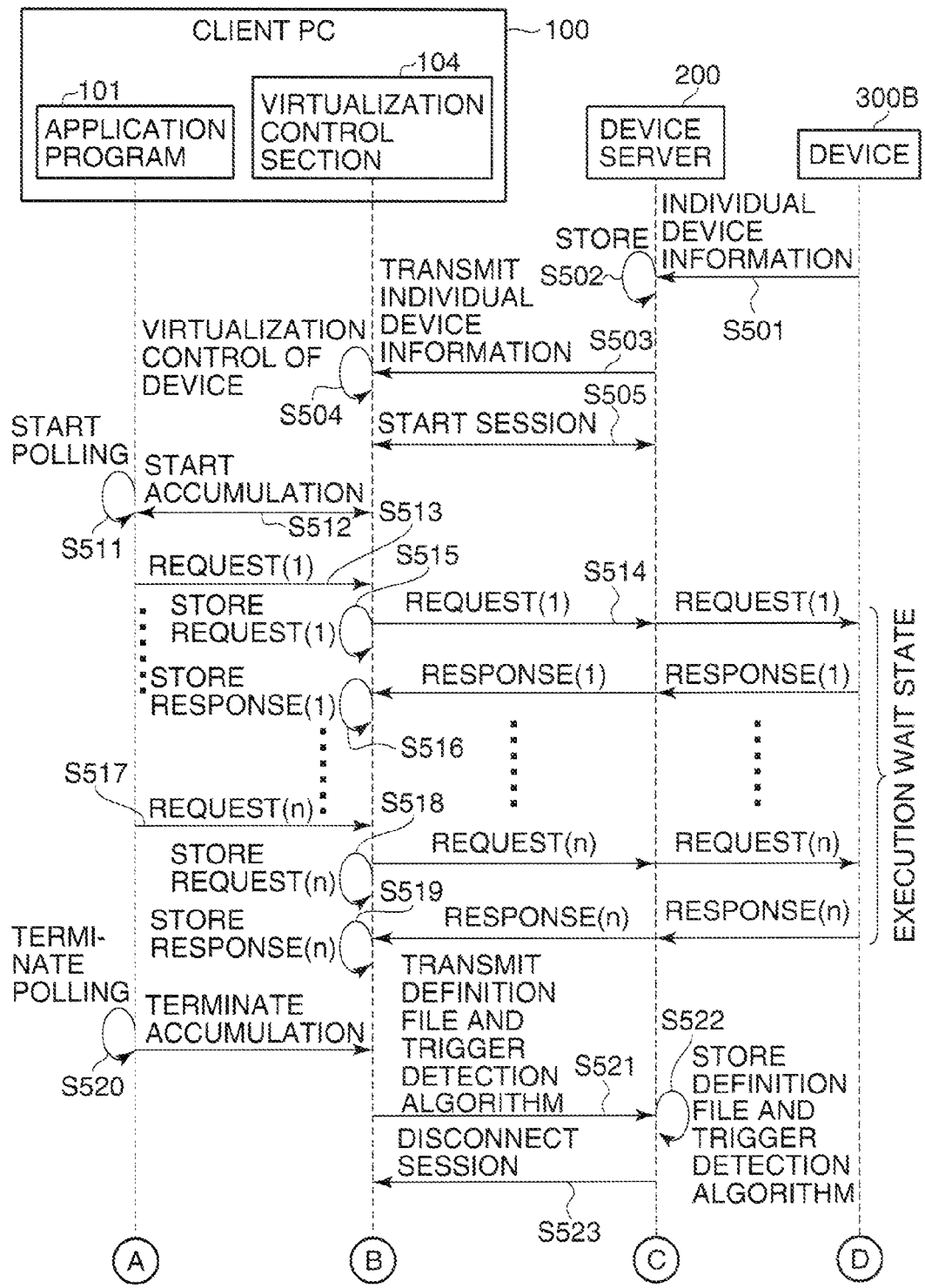
FIGS. 5A and 5B are a sequence diagram useful in explaining an operation sequence executed by a device control system according to a second embodiment of the present invention.
Figure 5B:
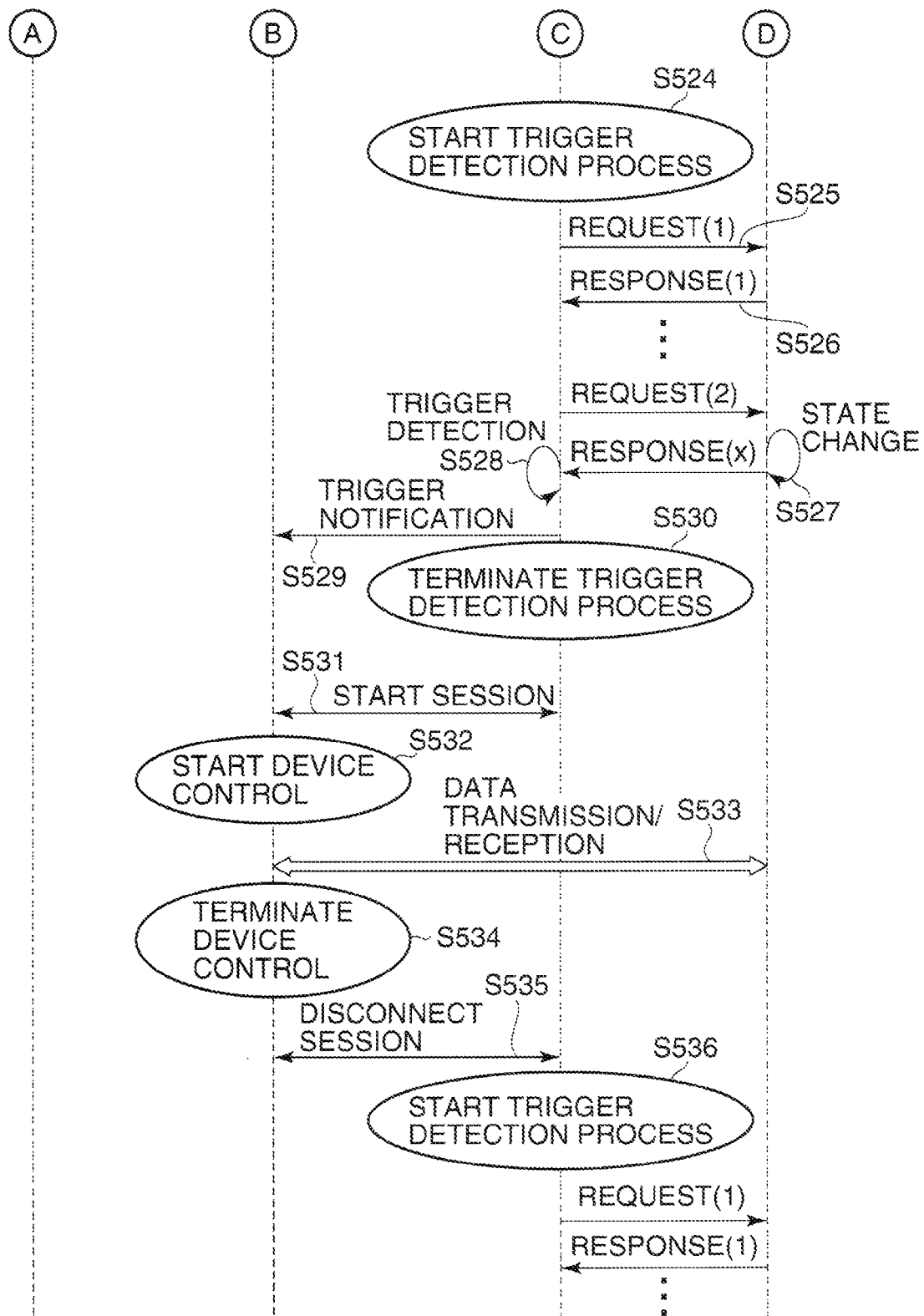

FIGS. 5A and 5B are sequence diagrams useful in explaining an operation sequence executed by a device control system according to a second embodiment of the present invention. FIGS. 5A and 5B show a process of data transmission/reception performed between the client PC 100 and the device 300B connected to the device server 200.

The device control system according to the second embodiment is identical in system configuration to the device control system in FIG. 1. Differently from the above-described first embodiment, the second embodiment has a feature that the client PC 100 polls the device 300B detected to have been connected to the device server 200, accumulates request and response packets sent during the polling, and sends these as definition files to the device server 200.

Specifically, the virtualization control section 104 of the client PC 100 polls the device 300B via the communication control section 105 and the communication section 115 according to an instruction from the application program 101 so as to check a response sent when no state change has occurred in the device 300B, e.g. a response in an "execution wait state" where the device 300B is not performing processing or control, and causes the data storage section 106 to store request and response packets transmitted and received during the polling.

Further, in the operation sequence in the operation sequence in FIGS. 5A and 5B, in a trigger detection process in the present embodiment, which will be described hereinafter with reference to FIG. 8, a response packet from the device 300B is compared with response packet data patterns contained in a definition file, and when it is determined by the comparison that the response packet from the device 300B does not match any of the response packet data patterns contained in the definition file (no match), a trigger notification is transmitted to the client PC 100. The second embodiment is distinguished by this point from the first embodiment in which a trigger notification is transmitted when a response packet from a device matches one of response packet data patterns contained in a definition file.

In FIG. 5A, an operation sequence up to a step where the client PC 100 starts a session with the device server 200 (steps S501 to S505) is the same as the steps S201 to S205 in FIG. 2.

When instructed by the application program 101 to start polling the device 300B detected to have been newly connected to the device server 200 (step S511), the client PC 100 instructs the virtualization control section 104, via the device driver 103, to start accumulation of packets, described hereinafter with reference to FIG. 6, transmitted and received during the polling (step S512) and transmission of request packets for checking the operating state of the device 300B (step S513).

The virtualization control section 104 causes the communication control section 105 to sequentially transmit a request packet for checking the operation state ("execution wait state" in the present steps) of the device 300B (step S514) and accumulate the request packet in the data storage section 106 at the same time (step S515). Further, the virtualization control section 104 causes the communication control section 105 to accumulate received response packet in the data storage section 106 (step S516). The operation is repeatedly carried out until a sequence of polling is completed (steps S517 to S519). Note that the virtualization control section 104 may instruct the communication control section 105 to record the packet transmission/reception process (e.g. the order of the packets) in the data storage section 106.

Figure 6:
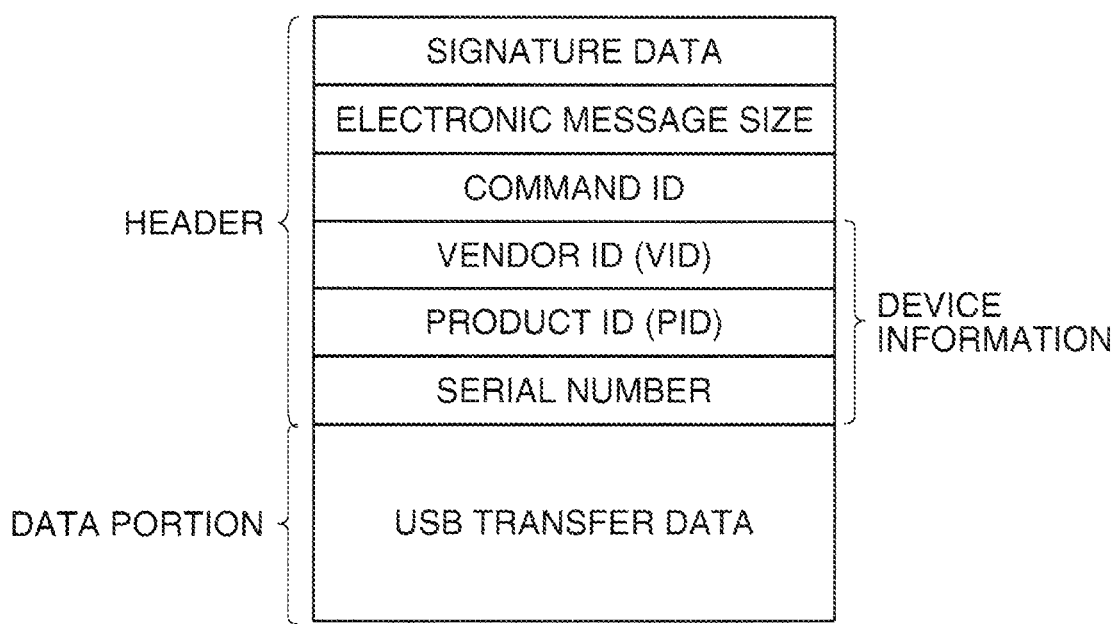
FIG. 6 is a diagram useful in explaining the data structure of a packet transmitted and received in the operation sequence in FIG. 5.

FIG. 6 is a diagram useful in explaining the data structure of a packet transmitted and received in the operation sequence in FIGS. 5A and 5B.

Referring to FIG. 6, a header contains signature data for identifying the protocol of the present system, an electronic message size indicative of the data size of the present packet, a command ID indicative of a packet type, and device information for identifying a device ("vendor ID", "product ID", and "serial number"). A data portion stores data corresponding to a packet type (command ID). Discrimination between a request packet and a response packet is performed based on the command ID.

Referring again to FIG. 5, when the application program 101 notifies the virtualization control section 104 of completion of polling (step S520), the client PC 100 instructs the virtualization control section 104 to terminate accumulation of the packets shown in FIG. 6 via the device driver 103. The virtualization control section 104 sends the request packets and the response packets accumulated in the data storage section 106 as a definition file (second definition file) described hereinafter with reference to FIG. 7 (step S521) and a trigger detection algorithm, to the device server 200.

Figure 7:
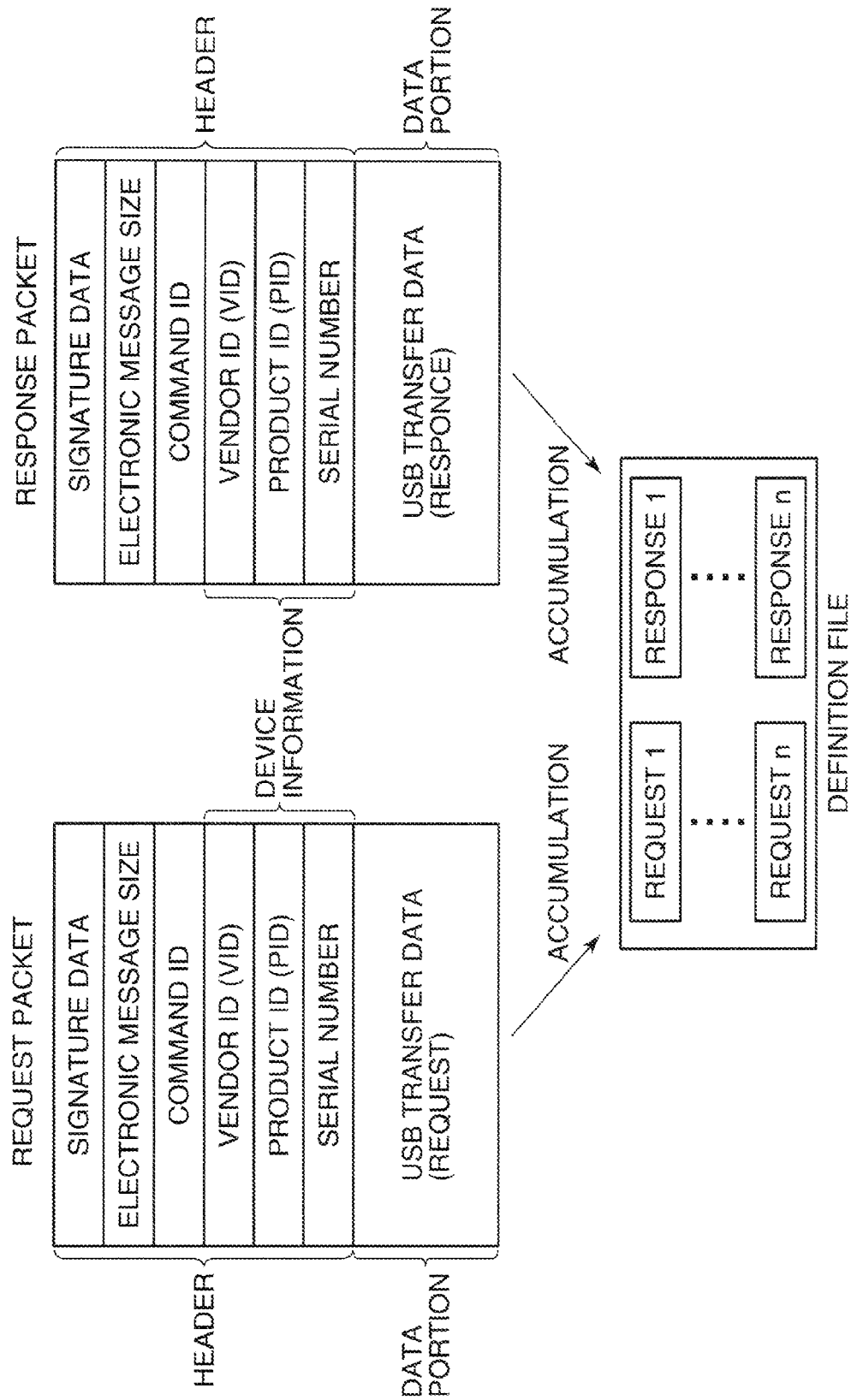
FIG. 7 is a diagram useful in explaining the data structure of a request packet and that of a response packet transmitted the operation sequence in FIG. 5 and a definition file generated by accumulating these packets.

FIG. 7 is a diagram useful in explaining the data structure of a request packet and that of a response packet transmitted in the operation sequence in FIG. 5 and the definition file generated by accumulating these packets.

The request packet and the response packet separately illustrated in FIG. 7 have the same data structure as that of the request packet and the response packet described with reference to FIG. 6. Therefore, discrimination between the request packet and the response packet is performed based on difference in the command ID, and the data portion (USB transfer data) of the packet stores data corresponding to a request or a response.

For example, in a case where n request packets are used for polling, n request packets and n response packets are accumulated in the data storage section 106, and these packets are sent as a definition file to the device server 200.

Referring again to FIG. 5A, upon receipt of the definition file (see FIG. 7) from the client PC 100 via the communication control section 201, the device server 200 stores the definition file as a definition file 205 in the data storage section 106 (step S522).

Upon completion of the transmission of the definition file 205, the session between the client PC 100 and the device server 200 is disconnected (step S523), and the trigger detection process in FIG. 8 is executed (steps S524 to S530).

The device control section 202 of the device server 200 starts polling similar to the polling by the client PC 100, using the definition file 205. In short, the trigger detection process in FIG. 8, which is associated with the device 300B, is started.

FIG. 8 is a flowchart of the trigger detection process executed by the device server 200 in FIG. 1. The trigger detection process in FIG. 8 is basically the same as the trigger detection process in FIG. 4, described hereinbefore, in the first embodiment, and the steps S401 to S409 in FIG. 4 correspond to steps S801 to S809 in FIG. 8. The trigger detection process in FIG. 8 is distinguished from the trigger detection process in FIG. 4 by the following points including the step S807.

Specifically, the device server 200 sequentially transmits request packets from the device control section 202 to the device 300B via the communication control section 201 and the communication section according to a request data pattern contained in the definition file 205 (step S525; step S802 in FIG. 8) and receives a response packet from the device 300B (step S526; step S803 in FIG. 8)).

The device control section 202 compares between the response packet from the device 300B and each of the response packet data patterns contained in the definition file 205 (step S806 in FIG. 8) to thereby determine whether or not there is a match between them.

Whether or not the response packet from the device 300B and each of the response packet data patterns contained in the definition file 205 match each other is determined e.g. by a method in which a comparison is made in the number of bytes from a packet head is performed between them, and when the difference is larger (e.g. by 3 bytes or more) than a threshold value set in advance, it is determined that there is no match, or by a method in which the received packet is compared with all the n response packet data patterns, and when the received packet is different in the number of bytes from all of the n response packet data patterns, it is determined that there is no match.

If it is determined that there is a match (YES to the step S807 in FIG. 8), the device server 200 judges that no state change has occurred, and sends a next request packet to the device 300B. As long as it is determined that there is a match, the device server 200 sequentially transmits the request packets contained in the definition file 205. Then, when it is determined that there is a match in data pattern between the final request packet and a response packet in response to the final request packet, the device server 200 determines that the polling is terminated (YES to the step S808 in FIG. 8), followed by terminating the present trigger detection process.

Note that when no response has been received within a predetermined time period after transmission of a request packet (timeout) (YES to the step S804 in FIG. 8), the process proceeds to the step S808, and since the answer to the question of the step S808 is negative (NO) in this case, the process returns to the step S802, wherein a next request packet is transmitted.

If error information is sent from the device 300B in response to a request packet (e.g. when the device 300B is disconnected) (YES to the step S805 in FIG. 8), the trigger detection process is terminated. After termination of the trigger detection process, the definition file 205 may be deleted from the data storage section 203 or the definition file 205 may be stored in the data storage section 203 so that it can be used when the device 300B is connected again (which is determined based on the PID and the VID).

On the other hand, when it is determined that there is no match (NO to the step S807 in FIG. 8), the device server 200 judges that a state change (step S527 in FIG. 5B) has occurred in the device 300B and has been detected, and sends a trigger notification (step S528 in FIG. 5B) indicative of this detection to the client PC 100 via the communication control section 201 and the communication section. The device server 200 terminates the trigger detection process in FIG. 8 and the client PC 100 receives the trigger notification (step S529 in FIG. 5B).

Upon receipt of the trigger notification from the device server 200, the client PC 100 starts a session with the device server 200, using the reception of the trigger notification as a trigger (step S531 in FIG. 5B). The following operation sequence (steps S532 to S536 in FIG. 5B) is identical to the operation sequence (steps S216 to S220) in FIG. 2, and therefore description thereof is omitted.

As described above, the client PC 100 polls the device 300B in a state where a trigger notification has not been sent, accumulates request and response packets transmitted and received during this polling, and sends the accumulated request and response packets to the device server 200 as a definition file. Thus, the monitoring of a state change of a device (trigger detection process) can be achieved.

In the second embodiment of the present invention, the client PC 100 may be further provided with a function of determining whether or not a definition file appropriate to an associated device 300 is held (stored) in the storage section 106. In this case, when a definition file generated in advance according to the functions (specifications) of the device 300 (see FIG. 3 in the first embodiment of the present invention) or a definition file generated by polling a device of the same model as that of the device 300 (see FIG. 7) has already been stored, the held definition file is sent to the device server 200 without generating a definition file by polling as described above, and only when a definition file applicable to the device 300 has not been stored, a definition file is generated by polling.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

In the operation sequence of FIG. 2 or 5A/5B, when the device 300 is connected to the device server 200, the device server 200 acquires individual device information and starts the operation sequence. However, e.g. when the power of the device server 200 or the device 300 is turned on, when an instruction is sent from the application program of the client PC 100, or when a predetermined connection operation is performed by one or both of the device server 200 or the device 300, the device server 200 may acquire the individual device information and execute the operation sequence in FIG. 2 or 5 based on the individual device information.

Further, the client PC 100 may send a simplified program (e.g. a shell or a script) which operates as a part of a trigger detection algorithm to the device server 200 together with a definition file, so that the device server 200 can execute the trigger detection process using the definition file and the simplified program.

In this case, the trigger detection algorithm causes the device server 200 to perform basic processing of the trigger detection process, such as polling of the device 300 and transmission of a trigger notification to the client PC 100, based on the definition file, and to carry out a part of the process, such as unique processing corresponding to the model of a device, based on the simplified program. For example, a condition determined (detected) as a state change differs from device model to device model, and therefore the simplified program can be used for execution of the determination.

With the above-described interoperation with the client PC 100 and the device server 200, the trigger detection algorithm is only required to describe the basic execution procedure, which is independent of any device model, of the trigger detection process, so that it is possible to handle a device of any type simply by generating a simplified program for executing processing corresponding to the model of the device.

The device server 200 may acquire the definition file and the trigger detection algorithm not from the client PC 100, but from a portable storage medium.

Further, if a device 300 of the same model as that of a device which has been connected before is connected to the device server 200 and a definition file and a trigger detection algorithm associated with the model have already been stored (installed) in the device server 200, the device server 200 is not required to acquire and store the definition file and the trigger detection algorithm. Further, the device server 200 may notify the client PC 100 that it is not necessary to transmit the definition file and the trigger detection algorithm.

Furthermore, it is possible to dispose a plurality of client PCs 100 in the system. In this case, the device server 200 can send a trigger notification to the client PCs 100 and permit a client PC 100 which first sends a request for starting connection for a session to establish connection (data exchange) with a device 300. Alternatively, the device server 200 may be configured to permit a predetermined number of client PCs of all client PCs having sent the connection start request to establish connection with the device 300. Further, when a specific client PC 100 cannot receive a trigger notification e.g. due to power-off or a failure, control may be performed such that the trigger notification can be sent to another client PC 100 as an alternative transmission destination.

In the above-described embodiments, the method (configuration) is described in which a definition file 107 and a trigger detection algorithm 108 associated with a device 300 are both stored in the client PC 100 appearing in FIG. 1 and the device server 200 receives the definition file 107 and the trigger detection algorithm 108 from the client PC 100. However, in the present invention, the following methods (configurations) can also be employed:

(1) Necessary trigger detection algorithms 108 are stored in the device server 200 in advance, and only definition files 107 are stored in the client PC 100. In this case, the device server 200 receives from the client PC 100 only a definition file 107 associated with the model of the device 300 identified based on device information.

This configuration can be applied e.g. to a case where access to the device server 200 is limited e.g. due to dependency on the specifications and design of software and hardware or a reason related to the operation and management of the system, and hence it is impossible to receive and execute (or install) a trigger detection algorithm (program code). This configuration is advantageous in that a trigger detection algorithm (program code) is stored in the device server in advance, which makes tampering difficult.

(2) The device control system may be configured such that only when a trigger detection algorithm or a definition file associated with the model of an identified device 300 is not stored in the device server 200, the device server 200 acquires the necessary trigger detection algorithm or the necessary definition file e.g. from the client PC 100.

Further, the device server 200 or the client PC 100 may manage trigger detection algorithms and definition files and may be caused to determine whether or not it is required to add or update a trigger detection algorithm or a definition file. With this configuration, the device server 200 can acquire all or part of the trigger detection algorithms and the definition files only when addition or update is required.

Further, the device control system may be configured such that the device server 200 accesses to the client PC 100 to download (acquire) a trigger detection algorithm and/or a definition file instead of receiving the same from the client PC 100 as in the above-described embodiments. In this case, the client PC 100 is only required to notify the device server 200 that the client PC 100 stores the associated trigger detection algorithm and/or definition file.

It is also possible to associate a plurality of definition files with one above-mentioned trigger detection algorithm to thereby control a plurality of devices 300 in a manner linked to each other. For example, in a case where a device A and a device B are controlled in a manner linked to each other, control can be performed such that after trigger notifications have been received from both of the two devices, the operation of the device A is started.

Note that the present invention can also be applied to a case where a plurality of devices 300 different in model are connected to the device server 200. In this case, the device server 200 stores definition files and trigger detection algorithms (a plurality of pairs) associated with the respective devices on a model-by-model basis. Then, a trigger detection process is executed based on each combination of a trigger detection algorithm and a definition file applicable to each device, whereby state changes of the respective devices 300 can be detected on a device-by-device basis.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-103755 filed May 6, 2011, which is hereby incorporated by reference herein in its entirety.

What is claimed is:

1. A device control apparatus connected to a client apparatus via a network and to which a device is to be locally connected, comprising:
a first detection unit configured to monitor a state of the device using a definition file and a trigger detection algorithm for monitoring the state of the device and detect a state change of the device, wherein the definition file is a data file storing information necessary for the trigger detection algorithm, and wherein the trigger detection algorithm is a program code describing an execution procedure for monitoring a state of the device;
a transmission unit configured to be operable when the state change of the device is detected, to transmit a trigger notification indicative of the detection of the state change to the client apparatus;
a data communication control unit configured to start a session with the client apparatus having received the trigger notification and relay data communication with the device, of which the state change has been detected;
a second detection unit configured to detect termination of the data communication with the device and resulting disconnection of the session with the client apparatus; and
a restart unit configured to be operable when the session with the client apparatus is disconnected, to cause said first detection unit to restart monitoring of the state of the device.

2. The device control apparatus according to claim 1, wherein the definition file is formed by a first definition file containing response information sent from the device when a state change of the device occurred, and
wherein said first detection unit includes a first determination unit configured to determine whether or not response information from the device and the response information contained in the first definition file match each other, and
wherein when the response information from the device and the response information contained in the first definition file match each other, said transmission unit transmits the trigger notification to the client apparatus.

3. The device control apparatus according to claim 1, wherein the definition file is formed by a second definition file containing response information sent from the device when no state change of the device occurred, and
said first detection unit includes a second determination unit configured to determine whether or not response information from the device and the response information contained in the second definition file match each other, and wherein when the response information from the device and the response information contained in the second definition file do not match each other, said transmission unit transmits the trigger notification to the client apparatus.

4. The device control apparatus according to claim 1, wherein when no response is received from the client apparatus, said restart unit causes said first detection unit to restart monitoring of the state of the device.

5. The device control apparatus according to claim 1, wherein when a request for a session with the device control apparatus is received from the client apparatus during monitoring of the state of the device, said first detection unit terminates the monitoring of the state of the device, and when the session is disconnected, said restart unit causes said first detection unit to restart monitoring of the state of the device.

6. A client apparatus connected, via a network, to a device control apparatus to which a device is to be locally connected, comprising:
 a generation unit configured to generate a definition file containing request information to a device locally connected to the device control apparatus and response information from the device, which were accumulated during polling for checking an operating state of the device;
 a transmission unit configured to transmit the generated definition file to the device control apparatus;
 a reception unit configured to receive a trigger notification indicative of a state change of the device from the device control apparatus having detected the state change of the device;
 a session control unit configured to start a session with the device control apparatus in response to the trigger notification received by said reception unit; and
 a virtualization control unit configured to virtually control the device of which the state change has been detected, via the device control apparatus with which the session has been started.

7. The client apparatus according to claim 6, further comprising
 a judgment unit configured to judge whether or not a definition file applicable to the device is held in the client apparatus itself, and
 wherein when said judgment unit judges that a definition file applicable to the device is held in the client apparatus, said generation unit does not generate a definition file, but said transmission unit transmits the definition file held in the client apparatus.

8. A device control system in which a device control apparatus to which a device is to be locally connected and a client apparatus are connected to each other via a network, wherein the device control apparatus comprises:
 a first detection unit configured to monitor a state of the device using a definition file and a trigger detection algorithm for monitoring the state of the device and detect a state change of the device, wherein the definition file is a data file storing information necessary for the trigger detection algorithm, and wherein the trigger detection algorithm is a program code describing an execution procedure for monitoring a state of the device;
 a transmission unit configured to be operable when the state change of the device is detected, to transmit a trigger notification indicative of the detection of the state change to the client apparatus;
 a data communication control unit configured to start a session with the client apparatus having received the trigger notification and relay data communication with the device, of which the state change has been detected;
 a second detection unit configured to detect termination of the data communication with the device and resulting disconnection of the session with the client apparatus; and
 a restart unit configured to be operable when the session with the client apparatus is disconnected, to cause said first detection unit to restart monitoring of the state of the device, and
 wherein the client apparatus comprises:
 a generation unit configured to generate a definition file containing request information to a device locally connected to the device control apparatus and response information from the device, which were accumulated during polling for checking an operating state of the device;
 a transmission unit configured to transmit the generated definition file to the device control apparatus;
 a reception unit configured to receive a trigger notification indicative of a state change of the device from the device control apparatus having detected the state change of the device;
 a session control unit configured to start a session with the device control apparatus in response to the trigger notification received by said reception unit; and
 a virtualization control unit configured to virtually control the device of which the state change has been detected, via the device control apparatus with which the session has been started.

9. A method of controlling a device control apparatus connected to a client apparatus via a network and to which a device is to be locally connected, comprising:
 monitoring a state of the device using a definition file and a trigger detection algorithm for monitoring the state of the device to detect a state change of the device, wherein the definition file is a data file storing information necessary for the trigger detection algorithm, and wherein the trigger detection algorithm is a program code describing an execution procedure for monitoring a state of the device;
 transmitting, when the state change of the device is detected, a trigger notification indicative of the detection of the state change to the client apparatus;
 starting a session with the client apparatus having received the trigger notification and relaying data communication with the device, of which the state change has been detected;
 detecting termination of the data communication with the device and resulting disconnection of the session with the client apparatus; and
 causing, when the session with the client apparatus is disconnected, monitoring of the state of the device to be restarted.

10. The method according to claim 9, wherein the definition file is formed by a first definition file containing response information sent from the device when a state change of the device occurred, and
 said detecting of a state change of the device includes determining as to whether or not response information from the device and the response information contained in the first definition file match each other, and
 wherein said transmitting of the trigger notification includes transmitting of the trigger notification to the client apparatus when the response information from the device and the response information contained in the first definition file match each other.

11. The method according to claim 9, wherein
the definition file is formed by a second definition file containing response information sent from the device when no state change of the device occurred, and
said detecting of a state change of the device includes determining as to whether or not response information from the device and the response information contained in the second definition file match each other, and
wherein said transmitting of the trigger notification includes transmitting of the trigger notification to the client apparatus when the response information from the device and the response information contained in the second definition file do not match each other.

12. The method according to claim 9, wherein said restarting of monitoring of the state of the device includes restarting of monitoring of the state of the device when no response is received from the client apparatus.

13. The method according to claim 9, wherein when a request for a session with the device control apparatus is received from the client apparatus during monitoring of the state of the device, the monitoring of the state of the device is terminated, and when the session is disconnected the monitoring of the state of the device is restarted.

* * * * *